Figure 1:
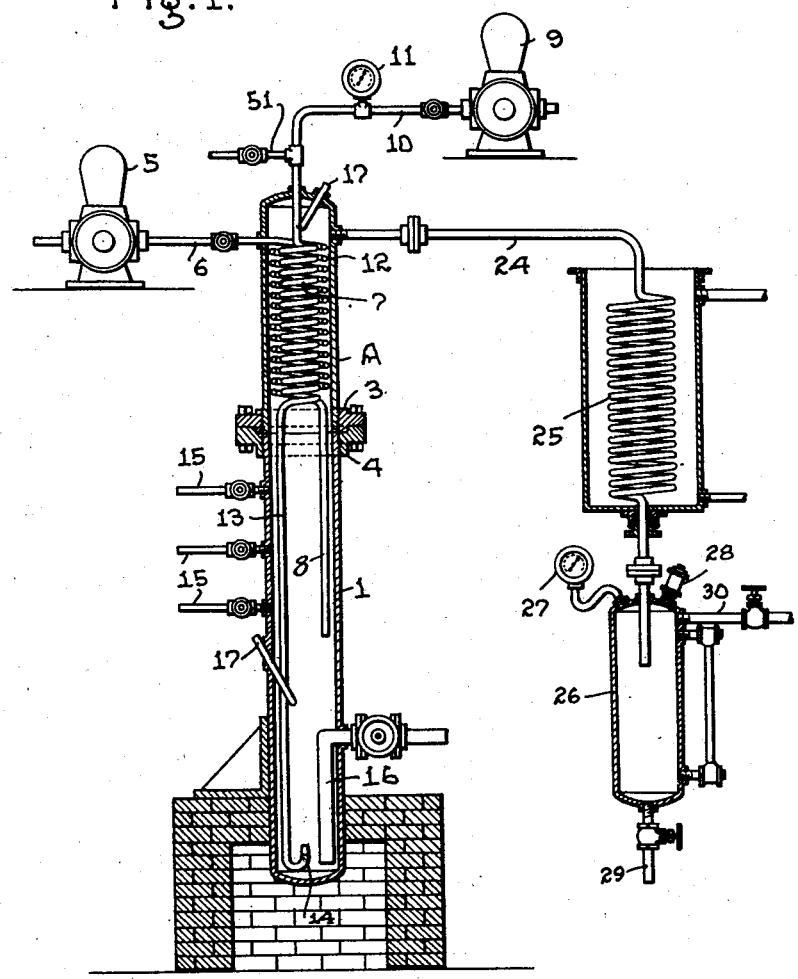

Oct. 11, 1938.　　W. B. D. PENNIMAN　　2,132,968

MOTOR FUEL

Filed Sept. 5, 1925

Inventor
WILLIAM B. D. PENNIMAN.

By Sol Shappirio
Attorney

Patented Oct. 11, 1938

2,132,968

UNITED STATES PATENT OFFICE 2,132,968

MOTOR FUEL

William B. D. Penniman, Baltimore, Md., assignor to Ellis-Foster Company, a corporation of New Jersey Application September 5, 1925, Serial No. 54,757

5 Claims. (Cl. 44—9)

This invention relates to motor fuels and to processes of making such fuels, and more particularly to the preparation of materials from hydrocarbon oils and related substances which either in themselves may be used as motor fuels, or which may be mixed with other substances and used as motor fuels.

One of the objects of this invention is the preparation of oxygenation and disintegration products from hydrocarbon oils and related substances which are suitable for use as fuels.

A further object of this invention is the preparation of oxygenation and disintegration products from hydrocarbon oils and related substances which may be advantageously mixed with other substances and used as fuels.

A still further object of this invention is the preparation of such materials as are set forth above, which possess anti-knock properties, that is substantially eliminate knocking in the motor when used as fuels.

A still further object of this invention is the preparation of such materials as are set forth above which convey to materials with which they are mixed for use as fuel, anti-knock properties.

Other and further objects and advantages of this invention will appear from the more detailed description set forth below, it being understood that said more detailed description is given by way of illustration only, and not by way of limitation, since various changes may be made therein by those skilled in the art, without departing from the spirit and scope of this invention.

This invention sets forth that when hydrocarbon oils such as petroleum oil or related materials as more fully described below, are subjected to the action of oxygen under proper conditions of treatment, which conditions are indicated and illustrated below, among other products, there are formed: A. Water; B. Organic materials soluble in water; and C. Organic materials insoluble in water. The organic materials thus produced include hydrocarbons and oxidized hydrocarbons, including compounds containing oxygen bound in the molecule, and among such substances there are included smaller or larger amounts (depending on the conditions of treatment and the substances treated) of substances of boiling point lower than that of the original substances acted upon. Such products may be used directly as motor fluids, or may be so used after admixture with other substances. For such use they will generally be separated from contained water, and purified to remove acids, aldehydes, ill smelling substances and corrosion producing materials, and as such form excellent anti-knock fuels for automobiles and other internal combustion motors. Such substances as generally prepared will mix in all proportions with ordinary gasoline and impart thereto anti-knock properties, the amount added to the gasoline, etc., being determined by the quality of the material with which it is being mixed, and the purposes to which it is to be put. When certain portions of the oxygenated compounds have been removed from the composite material before the latter is used for fuel purposes, other agents may be added thereto and to the mixtures with gasoline, such agents being hereinafter termed "binding solvents" and include as exemplary thereof such substances as methyl alcohol, ethyl alcohol, acetone, etc. One or more of such substances may be included in the mixture. The oxygenated distillates are largely free from certain defects inherent in straight petroleum distillates, as such oxygenated and disintegrated materials will stand a higher degree of compression in an internal combustion engine without giving rise to "knocking"; and distillates of higher boiling point than those customarily used, for example even the distillates corresponding in boiling point with ordinary burning oil giving satisfactory and successful use in an ordinary motor after it has become hot by running on other fuel. Further, the amount of carbon deposited in the engine cylinders is also very much less than when straight petroleum distillates are used. The oxygenated distillates referred to are generally soluble in alcohols, such as ethyl and methyl alcohol, and may be used in conjunction therewith, or with ketones, benzol and its homologues and ordinary petroleum distillates.

Figure 2:
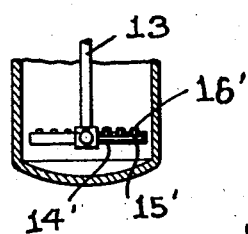

To illustrate one method of making such materials, the following example is given, taken in connection with the drawing which shows in Figure 1, a diagrammatic section or elevation of apparatus that may be used herein; and in Figure 2, a form of air nozzle that may be used.

Referring to Figure 1, the apparatus therein shown comprises an upright still or drum having heavy walls adequate to sustain a pressure of three hundreds pounds or more per square inch. The still is preferably made in two sections A and B, secured together by companion flanges 3, 4, and suitable bolts. The still is mounted above a gas fired furnace of any suitable construction. Oil is introduced into the still by a pressure pump 5, from which leads a delivery pipe 6, having within the still head, a core 7, and a depending delivery pipe 8. Air is forced into the still from a pump 9, through pipe 10, having a pressure gauge 11, coil 12 (within the still), and depending pipe 13 provided at its lower end which is near the bottom of the still, with an upwardly directed delivery nozzle 14. Blow cocks 15, enable the level of the oil in the still to be ascertained. 16 is a blow-off line through which residual material may be removed. 17, 17 are thermometer wells. 24 is a vapor line leading to a condenser coil 25, which is connected to collecting pump 26 provided with a pressure gauge 27, and safety valve 28. The liquid collected in tank 26, is delivered through pipe 30, suitable storage or collecting vessels of course, being connected to pipes 29 and 30.

Only one air delivery pipe has been shown but as many more as are necessary, are used in stills of larger diameter than that shown. A modified form of air nozzle is shown in Figure 2 in which a number of radiating pipes 14' provided with apertures in their upper surfaces, are secured to the end of the air pipe. These apertures 14' are preferably formed by tapering nozzles 15' having their small cross sectional area at the outer or delivery end 16' of such nozzles. With this construction there is no tendency toward accumulation of carbon in these nozzles and no localized heat accumulation due to secondary combustion of such accumulated carbon.

The following specific example illustrating the application of the process to the treatment of a petroleum oil is given below, it being understood that the process may be similarly applied to other materials as set forth below and related substances.

The hydrocarbon used was a Mid-Continental gas oil containing about one percent of sulphur, and having the following characteristics:

Specific gravity at 60° F. 38.3° Bé.

| Distillation | Oil | Vapor |
| --- | --- | --- |
|  | °F. | °F. |
| Initial boiling point | 552 | 432 |
| Temp. 10% distilling | 582 | 525 |
| Temp. 20% distilling | 600 | 538 |
| Temp. 30% distilling | 615 | 575 |
| Temp. 40% distilling | 631 | 592 |
| Temp. 50% distilling | 645 | 606 |
| Temp. 60% distilling | 661 | 624 |
| Temp. 70% distilling | 671 | 642 |
| Temp. 80% distilling | 701 | 666 |

The still used was a vertical one, four feet in diameter and twenty-six feet high. The air jets were three feet from the bottom of the still. A cooling coil on the head of the still was arranged so that the vapors and gases passing to the condenser were maintained at a temperature of 315° F. The oil was preheated to 500° F. before the still was operated. The still contents of 23 barrels was maintained during the run. The pressure in the still was ±300 pounds during the run and the air used was about 300 cubic feet per minute, the pump pressure being about 350 pounds. After the air was turned into the still, the temperature rose from 500° F. to about 725 to 750° F. Distillation was evident soon after the air was turned into the still. The rate of distillation increased as the still and its contents heated up, but after the desired range of temperature was reached, it was kept approximately constant during the remainder of the run by manipulation of the entering oil and air control valves and the amount of sludge withdrawal. The charging oil was in part new oil and in part oil that had been separated from the sludge of the previous run. The average input and output of the still per hour were as follows:

Oil 100%; 4 bbls. per hour; net oil used, 4−1.4=2.6 bbls.
- Carbon dioxide and water equivalent to .7 gallons of oil.
- Volatile hydrocarbons escaping an ordinary condenser equivalent to 1 gallon of oil.
- Water soluble organic compounds equivalent to ¼ bbl. of oil:
  - Acetaldehyde and solvents to 80° C., 67%;
  - Acid and gum, 35%.
- Gasoline distillate—equivalent to 2.66 bbls. of oil yielding over 2 bbls. of finished gasoline.
- Carbon equivalent to 1/16 bbl. of oil.
- Oil returned to system:
  - 1 bbl. after carbon separation.
  - .4 bbl. from gasoline distillate, etc.

The distillate obtained during the run as it runs from the condenser is an emulsion highly charged with gas, and is referred to hereinafter as "intermediate distillate." It was run into a separation tank and allowed to stand until a fairly sharp separation into two layers took place. Separation in the receiver under pressure is usually much slower. This separation results in an upper layer containing water immiscible substances, and a lower layer containing a water solution of organic substances. But since some of the constituents are mutually soluble, there is a distribution of these mutually soluble substances between the two layers. Some of the valuable organic substances found in the lower layer, can be obtained from the upper layer by washing the latter with water, the amount of water so used for washing purposes being carefully proportioned so as to avoid undue dilution of the organic material recovery of which is sought. Washing several times using from 3 to 10% of water for each wash effects a satisfactory separation. These water washes from the upper layer are added to the lower layer.

In the typical and illustrative case set forth above, the intermediate distillate was separated into two portions: the first being the upper layer containing the water insoluble crude oxidized distillate and the second, being the lower layer containing the water soluble crude oxidized distillate. The following methods used for treating these distillates to recover valuable products therefrom are exemplary only and not limiting in any way, since from the nature of the products hereinafter set forth, various methods of separation of particular fractions or compounds therefrom will be apparent to a skilled worker in this art.

A portion of the water insoluble crude oxidized distillate was treated with ten percent caustic soda solution in an agitator for about one hour. Acids, phenols, aldehydes, etc., which are present, are dissolved, and can be separated from the caustic solution in a variety of ways. Another portion was first treated with a ten percent solution of carbonate of soda to remove acids, and then with caustic soda to withdraw the aldehydes (as gum) and the phenoloid bodies. In a third portion, the aldehydes were first largely withdrawn by means of a concentrated solution of sodium bisulphite, the other desirable substances being subsequently removed by the use of methods analogous to those set forth above.

Following the treatment with caustic soda, the material may be washed with water and then treated with a small portion of sulphuric acid. If strong acid is used it is advisable to keep the temperature low during such treatment, while with dilute acid the temperatures used may be higher. The crude water insoluble distillate was then distilled in a fire still, although a steam still may be used, the distillate up to 400° F. being separately collected. A further fraction taken between 400 and 500° F. may also be utilized. The conditions of treatment may be varied so that a motor fluid with the customary end point of 437° F. is obtained. It is a simple matter to obtain high yields in this process, for example, 40% of such motor fluid, and if desired, the process may be forced to give higher yields say up to 75 to 90%. The character of the various distillates is evidently affected and controlled mainly by the following factors:

1. Kind of hydrocarbon used.
2. Temperature maintained in the still.
3. Subdivision of the air current.
4. Rate of withdrawal of sludge (free carbon content of oil in still).
5. Kind and amount of any catalyst used.
6. Presence or absence of neutralizing agents or other materials that will combine with substances formed during treatment.
7. Pressure maintained in the still.
8. The "run back" of the still head and the temperature maintained therein.
9. The treatment of the vapors while in the still head or by auxiliary apparatus either by chemicals or catalysts, for the purpose of altering their composition.
10. The mode of condensation.

In the example which has been set forth at length above, no chemicals or catalysts were used during the distillation and the following temperatures and pressures were maintained:

Temperature of still_____deg. F__ 725 to 750
Temperature of still-head at exit_____deg. F__ 325 to 350
Pressure in still_____lbs__ 300 to 325
Percentage of immiscible hydrocarbons below 400° F_____per cent__ 89
Percentage of hydrocarbons of boiling point 400 to 500° F_____per cent__ 8

In the given example, the hydrocarbons with a boiling point above 400° F. were returned to the still during a subsequent run, but they may be utilized as indicated above after purification.

In the fraction up to 400° F. is a gasoline substitute which differs markedly in its properties from the ordinary commercial varieties of gasoline. Such differences are present in both the physical and chemical properties due, without doubt, to the fact that whereas, in ordinary or cracked gasoline there is little or no oxygen, the gasoline substitute referred to above contains oxygen, which may amount to 3% or more. It has a characteristic odor. Further, this motor fluid will stand a high compression in the motor cylinder without premature ignition. It is also readily soluble in ordinary 95% alcohol in all proportions and can be mixed with ordinary gasoline, benzol, acetone and organic liquids in general. Blended fuels may thus be made. In some cases to meet the requirements of some of the States, where motor fuel gasoline or its equivalent must be of a color corresponding to 16 Saybolt or better, it may be necessary to refine the motor fuel referred to above with such bleaching agents as will yield this color. The residue remaining in the still after removal of the volatiles therefrom in this treatment of the motor distillate, is desirably returned to the oxidation still for retreatment. The water insoluble portions containing oxygenated products, is such that after it has been purified from noxious and gummy materials, in one of the ways set forth herein, it forms an excellent anti-knock fuel for internal combustion engines. This is true even of those distillates whose boiling points are higher than the highest boiling fractions present in ordinary motor fuel derived from petroleum, in present day use.

Sulphuric acid material derived as set forth above is substantially different in its properties from the acid sludges obtained from treating ordinary petroleum and its distillates. This is due in large part to the presence of alcohols in the crude water insoluble oxidized distillate, which alcohols combined with sulphuric acid in a manner different from that of the unsaturated substances predominating in straight petroleum distillates. This novel sulphuric acid sludge is diluted with water and steam distilled. The alcohols which are distilled off and the organic residue that remains in the still may be both utilized.

Other methods for treating the crude water insoluble oxidized distillate may be used. For example, this so-called "motor distillate" may be purified by passing it through fuller's earth, silica gel, or heated bauxite. Or in another method of treatment the distillate may be redistilled with aluminum chloride. Or again in order to separate aldehydes, particularly, the distillates after treatment with sodium or potassium carbonate and sometimes after the caustic soda treatment, may be redistilled with aniline in amount equal to 5% for example, or with phenol, or other gum forming (condensation) substances, used in any required proportion together with such quantities of acids or alkalies as is customary.

In view of the fact that the oxygenated materials referred to herein possess the property of keeping small quantities of water in solution in such materials as gasoline, etc., and since small quantities of water are sometimes desirable in motor fuels in order to obtain smoothly running motors, motor fuels containing a small amount of water and a sufficient amount of oxygenated material to keep the water in solution in the fuel, may be made. One such composition, for example, may contain gasoline, oxygenated material, and water. Other substances may be added to the compositions if desired.

The water soluble crude oxidized distillate was separated as set forth above from the water immiscible content of the intermediate distillate. This water solution of organic substances together with any added fractions of water soluble matter added thereto from washings of the water insoluble material as set forth above, was found to contain approximately 18% of organic material of the following composition: acids, 3%; being mostly acetic acid, with indications of dibasic acids; aldehydes, 7%, principally acetaldehyde and propionaldehyde; ketones, 3%, including acetone; and alcohols 5%, both saturated and unsaturated alcohols being present. This water solution was treated as follows: 15 bbls. thereof were placed in a copper still provided with a high fractionating column. 12 fractions of 7 gallons each were taken from this still ranging in boiling point from about 20° C. to 95° C. The first and second fractions consisted of practically pure acetaldehyde, the last fraction containing however, a considerable quantity of water. The intermediate fractions contained only small amounts of water and the boiling points ranged up to 85° C. These distillates are rather complex and have been found to contain aldehydes, ketones, alcohols, and acids as well as unsaturated compounds, and compounds formed by combination of the primary substances just mentioned above. Acetaldehyde is readily separated by distillation. Distillates 3 to 12 inclusive, were treated with caustic soda solution and redistilled. The caustic soda acted to fix the aldehydes and acids and perhaps other substances, leaving a resultant "white solvent" of boiling point range from 45° C. to 85° C. This white solvent amounted to about two-thirds of the organic matter present in the original water solution of organic substances obtained from the intermediate distillate. It is a clear, transparent liquid with a pleasant odor. It mixes in all proportions with water, alcohol, ether, benzol, and petroleum. It mixes with gasoline in all proportions and gives to the latter anti-knock properties. It also mixes with kerosene and reduces its knocking properties in the motor. To such mixtures with gasoline referred to immediately above, other substances such as alcohol, ether, benzol, etc., may be added for the purpose of making blended fuels. This white solvent, or fractions taken therefrom, is a solvent for shellac, gums, nitrocellulose and .er cellulose esters, and when the alcohols present are combined with organic acids, the solvent properties thereof are improved for many purposes. The white solvent or fractions thereof, can also be used for the extraction of fats and of medicinal principles. For desired purposes, a white solvent substantially free from acetaldehyde can be obtained by subjecting the watery liquid remaining after distilling off most of the acetaldehyde from the crude water soluble distillate, to further distillation, as with anilin to fix any remaining aldehydes, in the form of gummy material. This method of fixing the aldehydes may also be used in the treatment of the crude water insoluble distillate referred to at length above. In either case, any excess anilin, for example, may be easily removed from the distillate. Further, in treating these aldehyde containing fractions of the distillates, they may be distilled with ammonia. The undesirable odor and any other noxious qualities are thus removed. Some of the aldehydes will pass over. A water white solvent of pleasant odor, etc., is thus obtained. The ammonia present in such distillates possesses anti-knock properties and since such distillates may be mixed with ordinary gasoline or other motor spirit, they offer a convenient source of introducing ammonia into fuels for the purpose of securing anti-knock properties therein.

The neutral or alkaline still residue remaining after the white solvent separation, was treated with sulphuric acid until acid in reaction, whereupon substances combined or dissolved by the soda solution were set free. It was then steam stilled and the organic distillate reworked. The residual gummy liquid remaining in the still, is insoluble in water, and is treated, first by washing with water, after which it may be combined with anilin or its homologs, hydrazine or its homologs, phenol or its homologs, or a combination of them, in either acid or alkaline condition. The gummy liquid if dried and subjected to heat treatment can be used for making gums of varying hardness as may be desired. The gum can also be used in admixture with other gums and substances.

A portion of the caustic soda used in the treatment of the crude oxidized distillate insoluble in water was also worked up by acidifying it and steam stilling the acidified material. The distillate contains the volatile fatty acids and phenoloid bodies, which are readily separated by carbonate of soda. The residual gummy substance which remains is utilized in the same manner as the gummy liquid obtained from the water solution referred to above.

The oil which is withdrawn from the main treatment still during the pressure oxygenation and disintegration thereof, and any residue in this still, contains oxygenated derivatives and may be worked up to separate fatty acids, for example, but is preferably returned to the still for retreatment.

It will thus be seen from the illustrative process as set forth above, that oxygenation and disintegration products are prepared from petroleum and related substances by contacting the substance to be treated, with an oxidizing medium under relatively high pressure. Preferably the oxidizing gaseous medium, such as air, is passed through the substance in a liquid condition under controlled conditions of heat and pressure. The substance undergoing treatment is desirably maintained as a deep layer or pool, air for example, being injected into the bottom thereof and bubbling upwardly therethrough, and supplying the oxygen necessary for oxygenation. The layer or column of oil is desirably maintained deep enough to rather completely deoxygenate the air during the period of its travel therethrough. A layer at least from two to three feet in depth, therefore is preferably employed, but obviously the rate of deoxygenation will vary with other factors such as pressure, etc. By complete or substantially complete deoxygenation in this manner, the inflammable vapors arising from the oil layer or column, are not in contact with oxygen in any material amount, whereby a hazard of operation is eliminated. The deoxygenated air consisting to a large extent of nitrogen, serves as a stripping agent, assisting in removing the volatile and gaseous products or a portion thereof from the zone of reaction.

The air current passing through the liquid material undergoing treatment also produces a certain amount of desirable agitation therein, creating a circulation which enables all portions of the liquid to be brought into advantageous contact with the air jets or bubbles. Special mechanical devices may also be used for increasing the agitation or circulation, although such devices are not recommended for the high pressure operations. Such devices may include baffles, interposed in the liquid layer to delay the upward travel of the air bubbles, furnishing obstructions to its course in addition to the obstructing effect of the liquid or any solid matter such as carbon that may be suspended therein. Baffles thus arranged will serve to hinder or retard the upward flow of the gases and vapors. If the baffles are arranged in a manner to bring about a circulation of the oil which tends to cause the carbon and other separated solid material to collect to a considerable degree in the lower part of the reaction chamber, this is advantageous as the tarry material or heavy liquid products remaining from the reaction may be drawn off at a lower part of the chamber, either continuously or intermittently, as desired.

The admission of air into the reaction chamber may be used to cause desired circulation, whether the still comprising the reaction chamber is placed horizontally or vertically. In the latter position a single distributor placed at or near the bottom ordinarily will serve for the admission and distribution of the air. In the horizontal form, the air may be introduced through a perforated pipe situated along the bottom and extending from end to end of the oxidation chamber. The movement of air upwardly through the liquid causes the liquid to swirl and circulate in a brisk manner, upwardly, then outwardly towards the walls of the containing vessel, and finally downwardly toward the source of air supply. Such circulation is effective in bringing about good contact between the liquid undergoing treatment and the air supplied to it. The air jets may also be arranged so that the movement of oil within the still is such that the heavier products are segregated in a selected portion of the still itself or an attachment thereto. The motive power of the air may also be utilized before or after discharge, to move paddles or other mechanical devices as may be desirable for the same purposes.

The position of the air nozzles controlling the point of entry of the air into the liquid hydrocarbon or other material undergoing treatment may be made a factor affecting the recovery of carbon from the still, depending on the type of still used. For example, in a still such as that described herein, the further the nozzle is placed from the bottom of the still, the less is the circulation caused in the oil by the incoming air. When placed about three feet above the bottom of the still, there is a zone of quiescence in which the carbon formed during the process may accumulate. However, when placed about 18 inches above the bottom of the still, the oil is in circulation throughout substantially all portions thereof, with the result that carbon is prevented from depositing and is kept in substantial suspension in the oil undergoing treatment, with the residues of which it may be subsequently withdrawn.

The substances which it is particularly proposed to treat in the processes hereindisclosed, are those rich in combined carbon and in general hydrocarbon mixtures of low grade such as crude petroleum and its various distillates, shale products and tars, pitches, waxes, sludges and residues of the petroleum industry; asphaltic oils, malthas, asphalt, cracked oils and residues from cracking stills, wood tar oils and wood tars, peat distillates, lignite distillates and in some cases, oils and tars resulting from the destructive distillation of coal; also oils, for example, petroleum oil, containing solid substances in suspension, such as powdered coal, coke, peat, and other oxidizable substances. Thus, finely divided bituminous coal may be suspended in petroleum and subjected to the oxygenation step. Other substances, either solid or liquefiable by heating, may be added to the oil forming the base raw material of oxidation. Ordinarily, it is not advisable to admix substances which are readily oxidized with those which are oxidized with great difficulty, as the conditions of temperature and pressure usually should be varied to secure most advantageous conversion, usually specific in each case. However, the transformation of one raw material undergoing oxygenation with relative ease, may facilitate the oxygenation of a substance of more difficult oxygenation, and therefore the use of mixtures of substances having substantially different oxygenation rates comes within the scope of the present process, especially when one substance has a stimulating effect on the oxygenation of the other.

A protracted series of experiments and tests have shown that the process is especially applicable to the treatment of cheap petroleum oils in a liquid state, by bubbling the air or other gaseous oxidizing agent, under heat and pressure, therethrough. In this simple and efficient manner, there may be established the preferred oxidizing condition in accordance with which the oil to be oxidized is present in predominant proportions; preferably being fed continuously into the charge in the oxidizing zone; thus reducing to a minimum the occurrence of ordinary destructive combustion, allowing the formation of valuable products of oxygenation and substantially eliminating the hazard of explosive conditions which might prevail should oxygen be present in predominating proportions. In view of the richness of petroleum in combined carbon and the adaptability of the process to the treatment of petroleum (mineral oils) and petroleum products in general as noted in the foregoing, the controlled oxidation of petroleum has been set forth as the preferred embodiment of the present invention. The term petroleum, however, is employed in a generic sense to embrace mineral or earth oils and solid hydrocarbons.

When the process is applied to certain petroleum oils containing a considerable proportion of sulphur, the oxygen may serve in part at least as a desulphurizing agent, by oxidizing the sulphur to yield sulphur dioxide. Thus, distillates of relatively low combined sulphur content may be obtained. This reaction tends to simplify refining operations involving the elimination of sulphur. The sulphur dioxide may be collected and converted into bisulphite solution or into any other suitable form. As the bisulphite it may be used to extract ketones or aldehydes in the subsequent operation of treating and separating the useful products of oxygenation. To the extent that sulphur is oxidized in this manner, heat is developed in the oxidation zone and assists to the same degree of its development in the maintenance of the temperature of the reaction chamber. Hence oxidation reactions of this character are advantageous not only from the standpoint of effecting desulphurization but also that of obtaining heat useful in the operation through the destruction of a deleterious substance. Any heat developed in this manner will lessen the heat required to be developed through the oxidation of desirable hydrocarbons. In some cases, sulphur may be added either for its calorific or for its chemical effect.

In the practice of one phase of the invention, a particular effect sought is the possibility of oxidizing finely divided carbon formed as a part of the general oxygenation process applied to petroleum and the like. In this way, a certain amount of heat may be supplied to the reaction chamber while eliminating some of the carbon which otherwise would remain in the spent sludge or tar drawn from the oxygenation chamber. In passing, it may be noted that the cracking of heavy petroleum oils in direct fired stills gives much trouble through the separation of carbon which sticks to the bottom of the still and forms a graphitic layer causing overheating and burning out of the still bottoms. When employing high pressures in cracking, the problem is a serious one to find a sufficiently resistant steel in the construction of the still bottom. In the present invention, such carbon as is formed will at the time of its liberation be in a very finely divided state, which no doubt, in part at least, is colloidal, and the oxygen-containing gases passing up through the oil column come into contact with these particles and are adsorbed. As a result the carbon may thus be oxidized selectively in greater or lesser degree, yielding a quota of heat for the maintenance of the temperature of the reaction zone. To the extent that heat is thus supplied by the oxidation of carbon, useful work is performed. If the object is to secure from petroleum a substantial proportion of lighter hydrocarbons and a minor degree of oxygenation, the heat supplied by the combustion of the carbon calls for less oxidation of the hydrocarbons themselves. With this tendency to oxidation of the very fine colloidal carbon, there is the opportunity of filtering the tar or spent oil withdrawn from the oxygenation zone, thus removing the coarser carbon which may be present and returning the filtered oil to the oxygenation chamber.

The range of utility of the disclosed processes includes the treatment of the residual oils from ordinary cracking stills; oils which have already been subjected to drastic treatment under heat and pressure for the purpose of obtaining the maximum amount of so-called cracked gasoline. Spent oils of this character which no longer can be further disintegrated by ordinary pressure cracking methods, may be subjected to oxygenation treatment in accordance with the disclosed processes to yield valuable products of cleavage and oxygenation. The addition of fresh petroleum oil to the spent oil before subjecting the latter to the process, is included within the scope of this invention.

Aside from the effect of any finely divided carbon present in the oil, as pointed out above, there may be added activating substances such as aluminum chloride, the oxides of manganese, lead, iron, chromium, vanadium, zinc, copper, or calcium and the like to assist in the oxygenation; such substances ordinarily being introduced in small or catalytic proportions. Larger amounts of alkaline substances or bodies having a neutralizing effect such as quicklime, limestone, or carbonated alkali may be added in some cases. In general, however, for carrying out the reaction on petroleum oils, no catalytic or activating substance is required. This is especially true when treating native petroleum or its fractions which have been unchanged by cracking or other treatment. Catalysts, however, sometimes may be used more advantageously on rather resistant coal tar distillates, spent oils from cracking stills, and similar raw materials which have experienced a treatment which tends to render them normally more stable and less easily attacked by oxygen.

As set forth above, the oxygenation agent employed, is preferably ordinary air, utilized without drying or modifying the normal moisture content as it may vary from time to time. Or it may be dried, if desired, to a uniform degree of humidity. Likewise for special purposes, moisture, for example as steam, may be introduced with the air blast. When the pressure required to prevent premature volatilization of the oil is so great that the consequent pressure of the incoming air yields too drastic a degree of oxidation, the air may be diluted with steam or diluent gases such as products of combustion, or with deoxygenated air discharged from the condensing apparatus. The enrichment or impoverishment of this entering air is also determined by the character of the oil treated, or of the products sought. On the other hand, when treating highly resistant organic material such as the spent oils from cracking stills or for securing deep-seated oxygenation effects, the air may be enriched with oxygen. Pure oxygen obtained for example by the liquefaction of air could be used for this purpose. Air at ordinary atmospheric temperatures may be used but in most cases, it is desirable to preheat the air to a considerable degree. Since the disclosed processes of oxygenation are desirably carried out at relatively high pressures, usually exceeding ten atmospheres and frequently considerably higher, the air is normally sufficiently preheated by the compression to which it is subjected in order to force it into the obstructing layer or column of oil in the oxidizing zone. The temperature may be further increased in some cases by having the compressed air travel through a heat interchanger before entrance into the reaction chamber. The heat interchanger may be arranged to utilize some of the heat of the outgoing gases and vapors. In some cases a coil may be placed in the upper part of the reaction chamber through which the air travels before entering the oil. The air thus compressed and preheated preferably is introduced into the oxidizing chamber in the lower part thereof where it is forced through the column of oil, desirably through distributing devices which cause the air to be projected into the oil as fine jets or bubbles. On entering the oil, the air bubbles encounter the resistance of preferably a deep column of said oil and this obstructing effect is oftentimes enhanced by the presence of carbon or other solid materials. The fine bubbles of air, therefore, may travel rather slowly upward through the pool of oil. As previously noted, the rate of travel may be retarded by the employment of baffles or other devices arranged to hinder such upward flow.

The employment of a continuous feed of raw oil in the disclosed processes possesses certain advantages. The level of the oil in the oxygenation chamber may be kept fairly constant, thus maintaining a column of oil of deoxygenating depth; that is, of sufficient depth to permit of the removal from the air supply of all or most of its oxygen during the course of travel from the point of its ingress to the surface of the oil. It is desirable also to withdraw a portion of the oil continuously from the reaction pool, preferably from the lower part. The rate of withdrawal may be adjusted with respect to the rate of feed of the oil into the chamber, to avoid departing materially from the constant level. Instead of continuous feed and discharge, the operation may be intermittent "portionwise", that is, with frequent alteration of feeding in portions and withdrawal in portions, without substantially disturbing the constant level conditions in the reaction pool.

The introduction of fresh raw oil into the still serves to maintain a degree of constancy of oxidizing conditions which is desirable. The contents of the chamber remain more or less uniform, more so than when a charge of oil is placed in a receptacle and blown with air until action substantially ceases. With continuous feed of oil or its equivalent, the air is at all times acting on a mixture of fresh oil and of oil which has been somewhat modified through reaction. Continuous introduction and withdrawal thus suffice to obtain that relatively constant composition which is important in securing uniformity of heat development and effective supervision of the apparatus.

The intermittent or batch process yields constantly changing conditions as oxygenation progresses and finally comes substantially to a standstill. In this case the conditions of operation are constantly changing and there is less effective control with variable conditions of heat development. Therefore, while certain features of the present invention may be practiced by the intermittent process, it does not constitute the preferred embodiment.

The continuous feed of oil also brings about a safer character of operation in that there is always present an abundance of fresh raw oil to which the oxygen has access and therefore the risk of collection of an excess of oxygen at any one point to bring about violent local reactions is minimized. The employment of an "average" pool of oil therefore constitutes a very desirable feature of the preferred form of this invention.

For each substance there exists a critical pressure or more strictly a critical range of pressure yielding a maximum proportion of specially desired products of oxygenation. Beneath this range inadequate yields or indifferent results appear while above this range, there is danger of destructive effect, through condensation, polymerization, and so forth.

If the raw material is very cheap, such a degree of destruction is not always serious, since other effects such as the spontaneous development of heat useful in the reaction or the elimination of some impurity, e. g., sulphur or carbon, may determine the conditions to be imposed, and pressures within the critical range at the approved temperature may therefore not always be required. However, this range should be approximated. Likewise there exists a critical temperature or range of temperatures at or within which the maximum yield of particular products may be expected. In some cases this range is a broad one, for example, between 300 and 1000° F. A narrower and more effective range is that between 600 and 900° F. For the treatment of petroleum oils to obtain oxidized products and especially motor fuels substantially free from knocking qualities when used in internal combustion engines, temperatures between 700° and 850° F. are desirably employed.

Restated, the process in the most desirable form, is that of passing air through the substance to be oxygenated, present in a liquid form or as a suspension in an appropriate liquid or molten material, at the critical oxidizing pressure and temperature or within a range which embraces such critical pressures and temperatures, and separating from the spent air current, the desired products of oxygenation and entrainment.

Pressures of not merely a few pounds above atmospheric, but of several hundred pounds or higher, invoke conditions of great moment with respect to the orientation of oxygenation. At low pressures air acts as an entraining rather than a sheer oxygenating agent, while at high pressures its oxygenating activity is surprisingly enhanced and the entrainment of heavy unoxidized bodies becomes a minor occurrence. This is a desirable condition to create since it permits oxidation to continue on the substances not oxygenated or sufficiently oxygenated, while products of lower molecular weight and of greater volatility or more easily sublimed, will be removed from the zone of oxidation and further conversion arrested. As the pressure is increased, the entrainment tends to diminish and may become a negligible factor with respect to the unoxygenated bodies present in the reaction zone. The spent air current or deoxygenated air therefore acts as a sweeping-out or purging agent to remove lighter bodies from the zone of oxidation and to prevent destructive oxidation to such ultimate products as carbon monoxide or carbon dioxide.

The employment of high pressures has the additional advantage that a comparatively small volume of gas is required to effect oxygenation. This allows the use of more compact apparatus, piping, and the like. Furthermore, there is less entrainment when the volume of gas is reduced. Entrainment which removes the products of oxygenation from the reaction zone is desirable, but too great a degree thereof, carries away from the reaction chamber a large proportion of the raw material which subsequently has to be separated from the products of oxygenation and oftentimes this is not an economical procedure. By the employment of the highly compressed gas diminished by pressure to say one-twentieth or to one-fiftieth the volume that it would occupy at ordinary atmospheric pressure, the degree of ebullition, spraying, and foaming is greatly reduced.

A bubble of air exposed to a pressure of 300 pounds above atmospheric has twenty times the amount of oxygen at its reacting surface, than it has at ordinary atmospheric pressure. At 900 pounds pressure, the oxygen at the surface is sixty times greater, and at 3000 pounds pressure, there is present two hundred times more oxygen. Thus, as the bubble passes through the hot material which is being oxygenated, the number of oxygen molecules ranged along the surface of the bubble for attack on the raw material is greatly altered by pressure and new and surprising effects are obtained by such alteration.

With some substances extremely high pressures may cause too extensive oxidation. On the other hand, pressures only slightly above atmospheric would bring about little or no action and the oxygenation would proceed at so slow a rate that the process would have little commercial interest.

While the most desirable results are obtained in the herein-described processes by the use of high pressures in the oxygenation zone, as more fully set forth and claimed in copending applications Serial Numbers 526,707, 541,525, and 541,526; and of application Serial Number 299,213, of all of which applications, the present application is a continuation in part; and in which applications there is shown the carrying out of the herein-disclosed processes both in single stills and in batteries of stills under pressures substantially above atmospheric; substantial results are also accomplished when pressures of atmospheric and below atmospheric are used as more fully set forth in copending application Serial Number 42,107. The products produced in these several processes are generically referred to hereinafter as "petroleum oxygenation and disintegration products"; while those from the processes involving the use of high pressures are hereinafter referred to as "pressure oxygenation and disintegration products" of petroleum etc.

The oxidizing chamber may be of heavy steel plate which, if desired, may be of chromium nickel steel or other material fairly resistant to the attack of sulphur, sulphur dioxide, and organic acids. The chamber is desirably cylindrical with concave or convex heads to withstand high pressures employed in accordance with the most desirable embodiment of the present invention. In appearance it may resemble an ordinary direct fired oil still. The cylinder may be placed horizontally or vertically.

There need be no fire-box or other provision for continuously heating the oxidizing chamber. The latter is desirably a "fireless still" the temperature of which is maintained solely by the heat of oxidation generated within the thick layer or column of oil, or preferably jointly by the heat of oxygenation and the heat supplied by the compression of the air supply; or by specially fired preheaters for the oil and/or air.

However, the foregoing does not preclude the employment of oxidizing chambers equipped with fire boxes if these are desired. The latter, for example, may be used only during the initial or "starting-up" period. When the oil has been heated sufficiently so that the oxygen of the air will react with it, the blast of preheated air may be turned on and heat is thenceforth spontaneously generated in the oil. Thereafter the fire on the grate may be kept at a low point or allowed to subside entirely.

Using a "fireless still" without fire-box equipment, the oil may be heated in a convenient receptacle to a temperature of say 500 or 600° F. and then charged into the oxidizing chamber. Air, preferably preheated is introduced and with an effective pressure in the chamber the oil begins to oxidize and the temperature will rise to say 700 or 750° F. remaining at that point by adjustment of air supply, the degree of preheat thereof, and the continuous introduction of preheated raw oil. In short, once the initial charge of oil has been heated to oxidizing temperature in a chamber continuously supplied with oil, no further application of heat by means of fire-box appurtenances is required.

The products produced by the processes set forth above are of great industrial significance. There are obtained in varying proportions depending on the materials treated and the steps of process treatment to which they are subjected, alcohols, aldehydes, ketones, fatty acids, phenoloid bodies, and solvents, a portion of the latter being soluble, and another portion insoluble in water. The water-soluble portion includes such bodies as alcohols, ketones, and the like, while the water insoluble portion includes a light fraction available as an extraction solvent but of especial and notable value as a motor fuel for internal combustion engines; a fraction utilizable as a varnish thinner or vehicle, and heavier water-insoluble products or oils utilizable in various ways, as for burning oils, fuels, flotation agents, and the like.

The first step in the recovery of such products is desirably condensation, preferably carried out under a pressure above atmospheric, normally approximating the same pressure as that of the oxygenating chamber. Condensers may therefore be in open communication with the oxygenating chamber and such pressure drop as may be observed in different parts of the condensing apparatus will be simply that due to condensation and loss of pressure by friction. However, there may be provided a shut-off valve or a check-valve between the still and condensers of the several sections of the latter to cut off any desired units or to reduce the pressure therein. Condensation at atmospheric pressure may be used, as well as such agents as silica gel, absorbent carbon or similar absorptive agents in the treatment of the tail gases to remove residual vapors such as light aldehydes and very volatile hydrocarbons. The tail gases thus treated will be found to contain a very high proportion of nitrogen which may be purified and used in admixture with hydrogen to make synthetic ammonia.

When properly deoxygenated, the tail gases will contain little or no oxygen, carbon dioxide will be present in moderate amounts, and sometimes a small proportion of carbon monoxide may be present, and possibly some ammonia in small amount.

The condensate is acid due to a variety of organic acids, which may include formic, acetic, propionic, butyric, and higher fatty acids of this series, also unsaturated acids, such as acrylic, aromatic acids such as phthalic acid or anhydride, etc. Sulphur dioxide also may be present. Hence it is desirable to construct condensers or at least that portion in which the acids condense, of material such as copper, chrome steel, nickel chrome steel, Monel metal and the like, notably resistant to organic acids. The employment of enamel-lined condenser tubes is not precluded.

The products of oxidation, distillation and condensation as noted, will be found to be made up of an emulsion which may stratify to form an upper layer of oily character and a lower layer of a water solution of organic substances. The emulsion or two layer condensate may be highly charged with gas particularly when pressure condensation has been used. The upper layer which contains water immiscible substances is hereinafter referred to as "motor distillate." Each of these distillates may be worked up in a number of ways as indicated above, to produce valuable commercial products. As outlined above in some detail, the character of the distillate is determined by a number of factors. These various factors are easily adjusted so that the "run back" of the still is reduced to a minimum. The process may be made practically continuous. The carbon formed during the process may be withdrawn from the bottom of the still from time to time, say at intervals of an hour, and oil supplied continuously.

In utilizing the vapors and gases which are swept out of the oxygenation and disintegration chamber by the current of deoxygenated air, or in other ways, the typical example as given above, makes use of condensation, desirably pressure condensation. During the working up of some of the products obtained from this intermediate distillate by distillation sub-processes, it is sometimes found to be desirable to use condensers supplied with brine instead of with water.

And while as set forth above, condensation is one desirable method of treating these effluent vapors and gases from the oxygenation zone, they may also be treated advantageously by other methods, either chemical, physical, or both, in order to produce valuable products therefrom. For example, they may be subjected to temperature treatments of various kinds; or they may be treated with adsorbents or materials such as fuller's earth, beauxite, or silica gel, etc.; or again they may be treated chemically to remove or to modify the components or some of them only, of the gases and vapors. Such treatments may be applied both before and after condensation, and either to the entire gaseous and vaporous product, or to selected portions thereof.

Further the effluent gases and vapors may be subjected to the action of a distilling head which acts either as a preheater, or to return all or a portion of the material to the still for further treatment or to a supplementary still or vessel for supplementary treatment.

The chemical and physical treatments set forth above may be carried out in towers under superatmospheric pressure if desired. In carrying out the various fractionation treatments that are set forth above, or for carrying out any of the fractionations or rectifications which may prove desirable, bubble towers may be used.

The oil which is withdrawn from the main treatment still during the pressure oxygenation and disintegration and any residues of oxidation products which are non-volatile under the pressure conditions imposed or are not entrained by the spent air current but which have been oxygenated to a degree that they constitute chemical derivatives of value, may be separated by appropriate extraction methods.

While the process as set forth above is exemplified by the treatment of hydrocarbon material, such material may be given a chemical treatment to produce chlorinated, nitrated, sulphated or other derivatives in the material before it is subjected to the pressure oxygenation processes outlined above.

In general it should be noted that the processes of pressure oxygenation and disintegration herein set forth are essentially different in character from the cracking processes, etc., heretofore known to the art. The products produced in the instant processes strikingly emphasize this differentiation. Furthermore, in these processes, it is possible, in view of the fact that there is a combination of oxygen during the treatment, to obtain yields of more than 100% based on the oil treated.

Having thus set forth my invention, I claim:

1. A liquid motor fuel containing the complex mixed volatile, liquid phase oxygenation and disintegration products of liquid hydrocarbons within the boiling point range for liquid motor fuel and produced by the air blowing of hot petroleum in liquid phase under superatmospheric pressure at a temperature of from 300 to 1000° F.

2. A liquid motor fuel containing complex mixed volatile, liquid phase pressure oxygenation and disintegration products of petroleum within the boiling point range for liquid motor fuel and produced by the air blowing of hot petroleum in liquid phase under superatmospheric pressure at a temperature of from 300 to 1000° F.

3. A liquid motor fuel having a boiling point up to 437° F. and containing complex mixed volatile, water insoluble, liquid phase pressure oxygenation and disintegration products of petroleum within the boiling point range for liquid motor fuel and produced by the air blowing of hot petroleum in liquid phase under superatmospheric pressure at a temperature of from 300 to 1000° F.

4. A liquid motor fuel containing complex mixed volatile, water soluble, liquid phase oxygenation and disintegration products of petroleum within the boiling point range for liquid motor fuel and produced by the air blowing of hot petroleum in liquid phase under superatmospheric pressure at a temperature of from 300 to 1000° F.

5. A liquid motor fuel containing an ammoniated distillate of complex mixed volatile, water soluble, liquid phase oxygenation and disintegration products of petroleum within the boiling point range for liquid motor fuel and produced by the air blowing of hot petroleum in liquid phase under superatmospheric pressure at a temperature of from 300 to 1000° F.

WILLIAM B. D. PENNIMAN.